United States Patent Office 3,133,109
Patented May 12, 1964

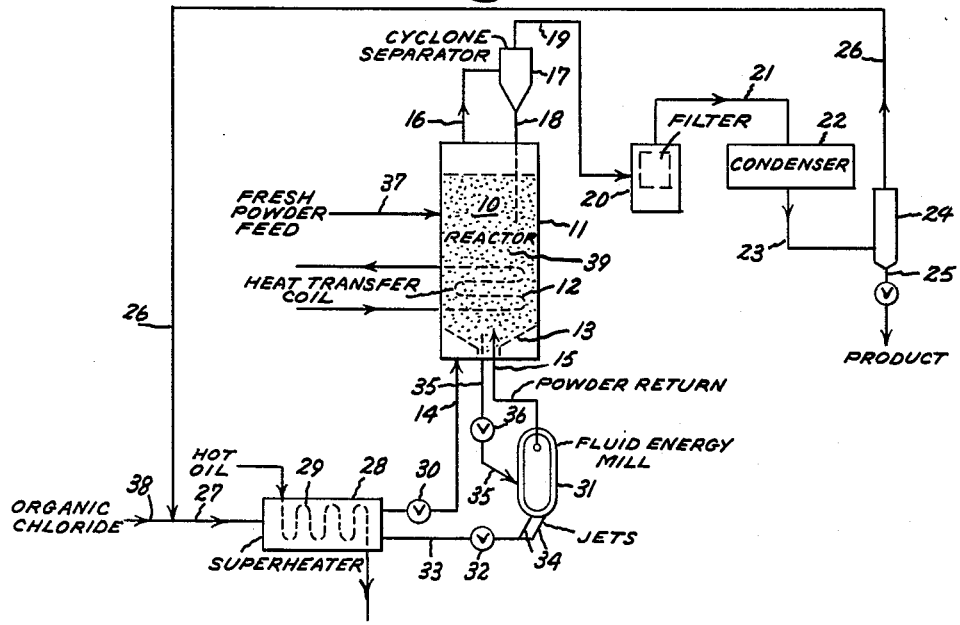
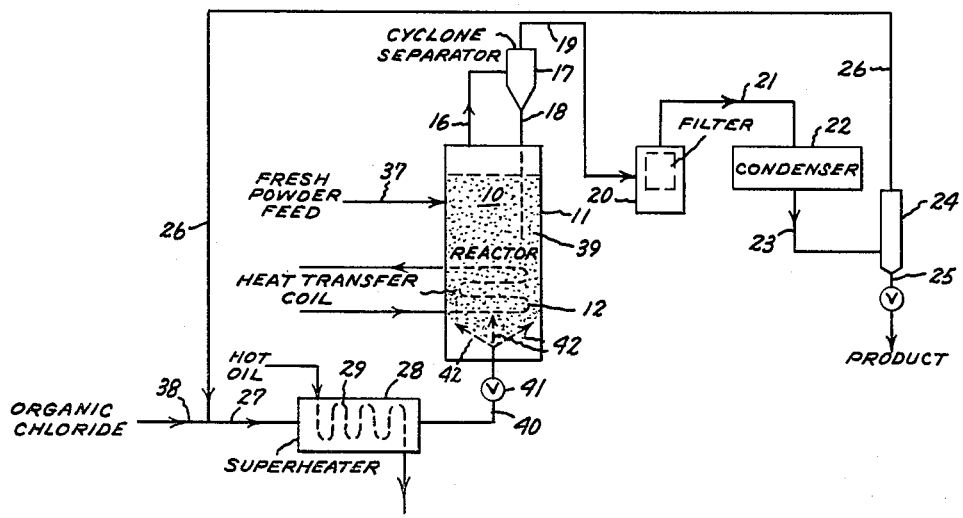

3,133,109
SILICON COMPOUND PROCESS AND APPARATUS
James M. Dotson, Rexford, N.Y., assignor to General Electric Company, a corporation of New York
Filed Nov. 28, 1960, Ser. No. 72,158
6 Claims. (Cl. 260—448.2)

The present invention relates to a process for the preparation of organochlorosilanes and to apparatus useful in such process. More particularly, the present invention relates to an improved process for the preparation of organochlorosilanes by the reaction of certain organic chlorides with silicon and to apparatus used in such process.

The present commercial method of manufacturing organochlorosilanes is described in Patent 2,380,995—Rochow and comprises the direct reaction of organic chlorides, such as methyl chloride or chlorobenzene, with elemental silicon. In practice, this reaction is generally carried out in one of three types of equipment. These equipments are the stirred bed type of reactor described in Patent 2,449,821—Sellers et al., the fluidized bed reactor described in Patent 2,389,931—Reed et al. or a rotary kiln. In general, the reaction is carried out by passing the organic chloride, in vapor or gas form over the surface of the silicon while maintaining the reaction mixture at an elevated temperature. Generally, the elemental silicon is mixed with finely divided copper powder as described in the aforementioned Rochow patent, the copper serving as a catalyst for the reaction between the organic chloride and the silicon.

In the reaction between the organic chloride and the silicon, the principal products are monoorganotrichlorosilanes, diorganodichlorosilanes and triorganochlorosilanes, all of which are useful in the preparation of organopolysiloxanes, such as the organopolysiloxane resins described in Patents 2,258,218 to 2,258,222—Rochow, the organopolysiloxane fluids described in Patents 2,469,888—Patnode and 2,469,890—Patnode and the organopolysiloxane elastomers described in Patent 2,448,756—Agens.

While all of the various types of organochlorosilanes prepared by the reaction of organic chlorides with silicon are useful in the preparation of the organopolysiloxane products mentioned above, it is found in practice that the diorganodichlorosilanes are required in amounts much greater than the amounts of organotrichlorosilane or triorganochlorosilanes for the preparation of these products. Unfortunately, the reaction between the organochlorosilane and the silicon produces a commercial excess of organotrichlorosilanes and an insufficient amount of diorganodichlorosilanes so that methods are continuously sought for decreasing the ratio of organotrichlorosilane to diorganodichlorosilane produced in the reaction.

Because satisfactory commercial methods for the improvement of this ratio have not been found, it has sometimes been the practice to further react the organotrichlorosilanes resulting from the aforementioned process with an organic Grignard reagent, such as methylmagnesium chloride or methylmagnesium bromide, to alkylate the organotrichlorosilane to a diorganodichlorosilane. While this method produces the desired materials, this production is accomplished only by adding an extra chemical process step to the overall reaction betwen the organic chloride and the silicon, which results in additional cost.

In the reaction between the organochlorosilane and the silicon, it is found that the nature of the reaction changes as the reaction proceeds. At the beginning of the reaction, the ratio of organotrichlorosilane to diorganodichlorosilanes is generally satisfactory. However, as the reaction proceeds, the ratio of organotrichlorosilane to diorganodichlorosilane gradually increases until this ratio becomes so high that an uneconomical proportion of organotrichlorosilane is produced. When the reaction becomes uneconomical because of an unacceptably high ratio of organotrichlorosilanes to diorganodichlorosilanes the reaction is terminated and the mixture of silicon and catalyst is discarded. This mixture of powdered silicon and copper which, for reasons which are not fully understood, has ceased to produce the desired ratio of various organochlorosilanes is usually referred to as "spent silicon powder."

The present invention is based on my discovery of a method and apparatus for retarding the rate at which the powdered silicon-copper mixture employed in the reaction with organic chlorides becomes spent, resulting in the maintenance for a markedly increased time of a predetermined maximum ratio of organotrichlorosilane to diorganodichlorosilane in said process. My method and apparatus are improvements over the method and apparatus of the aforementioned Reed et al. patent. The Reed et al. patent is directed to a continuous process for the production of organochlorosilanes by the passage of an organic chloride through a fluidized bed comprising fluidizable silicon particles with make-up silicon feed being intermittently or continuously added to the fluidized bed. Briefly, my invention comprises (1) adding to the fluidized bed make-up silicon having an average particle size greater than the average particle size of the silicon comprising the fluidized bed and (2) comminuting at least intermittently in a non-oxidizing atmosphere at least a portion of the silicon from the fluidized bed, the degree of comminution of said silicon being adjusted to maintain a substantially constant average particle size for the silicon comprising the fluidized bed.

My invention will be best understood by reference to the following detailed description in connection with the drawings in which FIG. 1 is a drawing of the preferred apparatus of my invention and FIG. 2 is a schematic drawing of a modified apparatus of the present invention.

The organic halides which react with silicon in the process of the present invention have the formula:

(1) $$RCl$$

where R is a monovalent organic radical, such as a hydrocarbon radical selected from the class consisting of alkyl radicals, e.g., methyl, ethyl, propyl, butyl, octyl, etc. radicals; aryl radicals, e.g., phenyl, naphthyl, tolyl, xyly, etc. radicals; aralkyl radicals, e.g., phenylethyl, benzyl, etc. radicals; alkenyl radicals, e.g., vinyl, allyl, etc. radicals; alkynyl radicals, e.g., ethynyl, propynyl, etc. radicals; cycloalkyl radicals, e.g., cyclohexyl, cycloheptyl, etc. radicals; and cycloalkenyl radicals, e.g., cyclohepteny, cyclohexenyl radicals, etc. Among the preferred organic chlorides within the scope of Formula 1 can be mentioned, for example, chlorobenzene, methyl chloride and ethyl chloride, with the preferred specific organic chloride being methyl chloride.

When the organic chloride of Formula 1 reacts with elemental silicon, the products formed consist primarily of organochlorosilanes having the formula:

(2) $$R_nSiCl_{4-n}$$

where R is as previously defined and $n$ is an integer equal to from 1 to 3. Specific examples of organochlorosilanes include methyltrichlorosilane, dimethyldichlorosilane and trimethylchlorosilane which are formed from methyl chloride; phenyltrichlorosilane, diphenyldichlorosilane and triphenylchlorosilane which are formed from chlorobenzene; and various other organochlorosilanes such as diethyldichlorosilane, dibenzyldichlorosilane, vinyltrichlorosilane, etc. which are formed from the appropriate organic chloride.

The elemental silicon with which the organic chloride reacts is in finely divided form and for optimum results, the silicon in the reactor has an average particle diameter in the range of from about 20 to 200 microns. Preferably at least 25 percent by weight of the silicon particles have actual diameters in the range of from 20 to 200 microns. While the reaction will proceed in the absence of a catalyst, it is preferred that the powdered silicon be mixed with powdered copper as taught in the aforementioned Patent 2,380,995—Rochow. The powdered copper acts as a catalyst for increasing the rate of reaction between the organic chloride and the silicon. When copper powder is employed, the copper is present in the range of from about 0.5 to 20 percent, and preferably from about 3 to 10 percent, by weight, based on the weight of the finely divided silicon. One form of copper powder catalyst useful in the practice of the present invention is the powdered copper partially coated with copper oxide which is described in Patent 2,443,902—Ferguson et al. and which has an average particle size in the range of about 1 to 20, and preferably 1 to 10, microns. In addition to the use of a catalyst such as copper, a promoter such as zinc metal, as taught in Patent 2,464,033—Gilliam, can also be employed with the silicon and copper. Where such a promoter is employed, it is used preferably in amounts equal to from about 0.05 to 0.5 percent based on the weight of silicon.

As previously mentioned, when employing an organic chloride such as, for example, methyl chloride, for the reaction with the copper catalyzed silicon, the ratio of organotrichlorosilane to diorganodichlorosilane, hereinafter referred to as the "$T/D$ ratio," increases from a low value to some higher value. For example, the $T/D$ ratio often begins at 0.25 and then drops after a short induction period to about 0.1 where it remains for a period of time. However, as the reaction progresses, the $T/D$ ratio begins to increase to some higher value such as 0.35 to 0.4 or even to ratios of 3.5 or more. Unexpectedly the process of the present invention permits the maintenance of the $T/D$ ratio below some predetermined value for a time much longer than the time that this ratio can be maintained employing the processes of the prior art. This ratio is generally maintained below about 0.35.

The process of the present invention is best described in connection with the drawings, using as an illustration of the practice of the present invention the reaction between methyl chloride and powdered silicon, employing copper powder as a catalyst.

In FIG. 1 there is shown apparatus for the continuous production of methylchlorosilanes employing a fluidized bed reactor. Fluidized reactor 10 comprises housing 11 which defines a substantially cylindrical reaction zone having a vertical axis. Reactor 10 is provided with heat transfer coils 12 which control the temperature of the reactants in the reactor and gas distribution plate 13 which distributes uniformly the fluidizing gas entering the reactor through line 14. Reactor 10 is also provided with outlet line 16 which is connected to a solid-vapor separator 17 which can be a cyclone separator, and powder return line 18 from separator 17. To separator 17 is connected line 19 which runs to filter 20 and line 18 which returns to reactor 10. Line 21 runs from filter 20 to condenser 22, which is cooled by means not shown. Line 23 runs from condenser 22 to distillation column 24 containing valved line 25 for delivery of methylchlorosilane product and line 26 which is connected to methyl chloride line 27. Line 27 runs to superheater 28 which is heated by coils 29. Superheater 28 is connected to reactor 10 through valve 30 and line 14. Superheater 28 is also connected to comminuting means 31 through valve 32 and line 33. In the drawing, comminuting means 31 is illustrated as a fluid energy mill having grinding jets 34 and inlet line 35 which is connected to reactor 10 through valve 36.

In the operation of the apparatus of FIG. 1 for practicing the process of the present invention, a fresh powder mixture of silicon copper as hereinbefore described is introduced to reactor 10 through line 37. A sufficient amount of powdered silicon and catalyst is fed to provide a powder charge from about 40 pounds per cubic foot to about 80 pounds per cubic foot of reactor volume. Heat transfer coils 12 in reactor 10 are maintained at a temperature sufficient to provide a temperature of from about 250° C. to 350° C. in reactor 10 which, during the reaction, is maintained at a pressure of from about atmospheric to about 100 p.s.i.g. by controlling its input and output through suitable valves, not all of which are shown.

Fresh methyl chloride is introduced into the apparatus through feed line 38 and line 27 into superheater 28 where the vapors are superheated by heat transfer fluid passing through coils 29. Superheated methyl chloride gas or vapor is then fed through valve 30 and line 14 into reactor 10 at a rate sufficient to provide a velocity in the reactor of from about 0.1 foot per second to 1.0 foot per second. This velocity is sufficient to fluidize powder 39 and maintain the powder in fluidized form so as to provide intimate contact between powder 39 and the methyl chloride vapors. While in intimate contact, the methyl chloride and the fluidized powder react in part to produce a mixture of unreacted methyl chloride and methyl chlorosilane reaction products. In entering reactor 10 through line 14, the methyl chloride is uniformly distributed by passing through gas distribution plate 13.

The mixture of unreacted methyl chloride and methyl chlorosilanes together with some entrained powder particles leave reactor 10 through line 16 and enter separator 17 where the coarser particles, i.e., particles having an average diameter greater than about 5 to 20 microns, are separated and returned to reactor 10 through line 18. The remainder of the material passes out of separator 17 and through filter 20 via line 19. In passing through filter 20, the powder particles having an average diameter of less than about 5 to 20 microns are filtered from the vapors for later disposal.

From filter 20, the mixture of unreacted methyl chloride and methylchlorosilanes passes through line 21 to condenser 22 where these materials are condensed into a liquid, which flows through line 23 to distillation column 24. In distillation column 24 the unreacted methyl chloride is separated from the methylchlorosilanes which flow through line 25 to a product storage area. Distilled methyl chloride is then recycled by pumping means not shown from distillation column 24 through line 26 back to line 27 and recycled through the system. Make-up methyl chloride is continuously introduced into the system through line 38 and make-up powdered silicon-copper is continuously added to the system through line 37.

Also during the continuous operation, a portion of powder 39 in reactor 10 is bled through valve 36 and line 35 to fluid energy mill 31. By proper adjustment of valves 30 and 32, some or all of methyl chloride leaving superheater 28 are passed into fluid energy mill 31 through grinding jets 34. These grinding jets are so constructed that the methyl chloride leaves the jets at a velocity approaching sonic velocity and the violent circulation of the silicon-copper powder in fluid energy mill 31 by the methyl chloride causes comminution of this powder, with the degree of comminution being controlled by the dimensions of fluid energy mill 31, the amount of powder bled into the mill through line 35, or by the pressure drop across the jets. After being comminuted in the fluid energy mill, the powder is returned to reactor 10 through line 15 at high velocity along with the methyl chloride used in energizing mill 31.

By following the foregoing procedure with copper-silicon powder make-up equal to the sum of the rate at which fine particles are removed from the system and the rate at which silicon powder is reacted, and by adding methyl chloride through line 38 at the rate at which methyl chloride is reacted, it is possible to continuously operate the apparatus of FIG. 1 with the maintenance for an extended period of time of a satisfactory $T/D$ ratio, which is preferably in the range of from 0.1 to 0.35, and with a satisfactory rate of reaction of the methyl chloride with the silicon, such satisfactory rate being from about 0.005 part to about 0.2 part silicon reacted per hour per part of silicon in reactor 10.

Instead of operating the apparatus of FIG. 1 in a completely continuous and steady state fashion, it is also obvious that certain of the operations accomplished by the apparatus of FIG. 1 can be effected on an intermittent basis. For example, instead of continuously withdrawing a portion of the powdered silicon-copper mixture from reactor 10 and continuously milling the withdrawn powder, valves 32 and 36 can be closed so that all of the methyl hcloride passing through super-heater 28 goes directly into reactor 10. As the $T/D$ ratio increases to some maximum, a portion or all of the methyl chloride can be employed to comminute a certain portion of the powder. This, of course, is accomplished by opening valves 32 and 36 so that powder is withdrawn from reactor 10 and ground in fluid energy mill 31 by the methyl chloride and returned to reactor 10 through line 15. This grinding can be continued for a time sufficient to reduce the $T/D$ ratio to the desired point. At this time the valves 32 and 36 can be closed to terminate the comminution and the reaction continued without comminution until the $T/D$ ratio again increases to an undesirable value. Instead of continuously distilling the mixture of methyl chloride and methylchlorosilanes coming from condenser 22, these materials may be stored and fractionally distilled at some later time, at which time the recovered methyl chloride is then used as fresh feed to the system.

In FIG. 2 is shown a modification of the apparatus of my invention in which the external fluid energy mill has been replaced with means for effecting comminution of the powder 39 inside of reactor 10. In particular, the hydrocarbon halide charged to reactor 10 through super-heater 28 passes through line 40 and valve 41 and through a plurality of jets 42 located at the base of reactor 10. These jets are so constructed that the methyl chloride leaves the jets at sonic velocity and the violent agitation of powder 39 in the vicinity of jets 42 causes comminution of the powder in the base of the reactor on a continuous basis so that withdrawal of powder from the reactor is not required. Aside from this change in powder comminuting means, the apparatus of FIG. 2 operates in a fashion identical to that of the apparatus of FIG. 1.

While my invention is shown in FIGS. 1 and 2 in terms of continuous or semi-continuous apparatus and with particular types of comminuting means for the silicon-copper mixture in the reactor, it should be understood that many modifications are possible within the scope of the process and apparatus of the present invention. For example, instead of employing a fluid energy mill for comminuting of the silicon-copper powder externally of reactor 10 as in FIG. 1, the grinding can be effected in other types of apparatus and the term "comminuting" as used in this application broadly refers to the use of any device which subdivides or grinds the copper-silicon mixture. Thus the terms "comminution" or "grinding" include such terms as crushing, pulverizing and disintegration, and would include breakage of individual particles of the powdered silicon-copper mixture from compression, impact or attrition. Devices that are useful for accomplishing this comminution include, in addition to the fluid energy mill described in FIG. 1 and the jet mill described in FIG. 2, direct pressure mills, disc mills, ball mills, roller mills, hammer mills, and the like.

An alternate method for practicing the process of the present invention, other than the method described in connection with the description of FIG. 1 and FIG. 2, involves the removal of a portion of the silicon-copper powder mixture from a reaction vessel such as reactor 10 and completely removing this powder from the reaction stream. This powder removed can consist of both fine particles as well as particles coarser than are useful in the practice of the present invention for the efficient production of organochlorosilanes of the desired $T/D$ ratio. If this mixture contains particles finer than about 5 to 20 microns, these particles are separated from the remainder of the particle, for example, by cyclone separation and the remaining particles are then subjected to comminution.

Alternatively, the entire powder mixture withdrawn from the reactor, which includes both coarse particles, average size particles and fine particles, can be subjected to comminuation and then after comminution the fine particles can be separated, for example, by cyclone separation. When this powder mixture, which has been withdrawn from the reaction system, is comminuted, the comminution can be effected in any of the types of equipment heretofore described, but one critical feature of the comminution is that a comminution must be effected in an oxygen-free atmosphere. For example, the comminution can be effected in an organic chloride atmosphere or an inert atmosphere, such as an atmosphere of nitrogen or one of the noble gases. When an organic chloride is employed as the atmosphere in which the comminution takes place, the organic chloride can be subsequently reacted with additional copper-silicon powder to produce the desired products, and where the velocity of the organic chloride used as a grinding medium is sufficient to entrain the comminuted copper-silicon powder, the mixture of organic chloride and copper-silicon powder can be fed directly to a reactor which is maintained at a proper reaction temperature. Where a gas such as nitrogen or a noble gas is employed as the environment in which the copper-silicon powder is comminuted, the ground material is separated from the inert gas and fed into the reactor.

As with any fluidized bed reaction, the quantities of the various materials added to the fluidized bed and the rates of addition can vary within quite wide limits depending on a number of variables. For example, the amount of copper-silicon powder charged to the fluidized bed reaction is a function of the volume of the reactor, the larger the volume, the more material charged at the beginning of the reaction. Likewise, the amount of methyl chloride or other organic chloride continuously fed to the reactor is a function of the volume of the reactor, the average particle size of the silicon-copper powder in the reactor and the rate of reaction of the organic chloride with the silicon in the reactor and the amount of silicon in the reactor. All other things being equal, as the amount of silicon in the reaction increases, the amount of organic chloride fed to the reactor and the rate of feed will increase. Similarly, as the average particle size of the powder in the reactor increases, the rate of addition of methyl chloride must increase in order to maintain a velocity in the reactor sufficient to fluidize the particles in the reactor, which particles are generally in the range of an average particle size of from about 20 to 200 microns. Since the rate of reaction between the organic chloride and the silicon powder is a function of temperature, the amount of methyl chloride added and the rate of addition is also a function of the temperature maintained in the reactor, with the amount of methyl chloride needed increasing as the temperature in the reactor increases. In addition to being dependent upon the rate of reaction and the average particle size, the amount of methyl chloride fed to the reactor is also a function of the geometry of the reactor. In general, fluidized bed reactors are cylindrical with a vertical axis. Therefore, as the diameter of the reactor increases, the amount of methyl chloride fed to the reactor over a given period of time must increase so as to maintain a velocity in the reactor sufficient to fluidize the particles in the reactor.

The rate of addition of make-up silicon-copper to the reactor also varies depending on a number of factors. In general, the make-up copper-silicon is sufficient to maintain a substantially constant charge of powdered silicon and copper in the reactor. The amount of charge in the reactor tends to decrease because of two factors. First, silicon is constantly reacting with methyl chloride and flowing out of the reactor as organochlorosilanes. In addition, any satisfactorily operated fluidized bed tends to elutriate finer powder particles and therefore the make-up silicon-copper must be equal to the amount of powder elutriated from the reactor as well as the amount of silicon which is used up by the reaction between the organic chloride and the silicon.

As previously mentioned, one of the critical features of the present invention is to maintain the average particle size of the silicon-copper feed greater than the average particle size of the silicon-copper mixture in the fluidized bed. While at first glance it might seem that the maintenance of such a differential is inherent in the operation of any fluidized bed, it is found in practice that in the fluidized bed reaction between elemental silicon and organic chlorides the average particle size of the fluidized bed actually tends to increase during the course of the reaction rather than decrease. This increase in average particle size is attributed to the reaction of some of the silicon and to the removal of fine particles, i.e., particles having an average diameter of less than from about 5 to 20 microns, by elutriation during the course of the reaction.

The actual differential in average particle size between the make-up silicon feed and the fluidized bed charge can vary within wide limits. However, it has been found that for optimum results the average particle size of the make-up silicon should be at least 1.2 times and preferably from 1.3 to 10 times the average particle size of the particles in the fluidized bed, which latter average particle size is, as previously mentioned, from about 20 to 200 microns.

Another critical requirement of the present invention is that at least a portion of the fluidized bed of the reaction of the present invention must be comminuted at least intermittently to maintain the average particle size of the particles in the fluidized bed at a substantially constant value. This comminution must be accomplished in a non-oxidizing atmosphere as hereinbefore described. This comminution markedly increases the length of time during which the fluidized bed reaction can be operated with the product from the reaction having a satisfactory ratio of organotrichlorosilane to diorganodichlorosilane. While the degree and rate of comminution of the silicon powder from the fluidized bed can vary within wide limits and proper operating criteria can be readily established by those skilled in the art, generally criteria can be given. Where the fluidized bed reaction of the present invention is operated in a completely continuous and steady state manner with a constant rate of addition of make-up silicon and with constant comminution of at least a portion of the silicon-copper mixture from the fluidized bed, such as, for example, by the apparatus shown in FIG. 1, it is often desirable to continuously withdraw from reactor 10 an amount of the copper-silicon mixture at a rate equal to the rate at which make-up silicon-copper is added to reactor 10. This withdrawn copper-silicon is comminuted in the fluid energy mill to a degree equal to the same percentage by which the average particle size of the feed silicon-copper mixture differs from the average particle size of the particles in fluidized bed 10. For example, where the average particle size of the silicon-copper feed entering reactor 10 through line 37 is 200 microns and the average particle size of the particles in fluidized bed 10 is 100 microns, the particles comminuted in the fluid energy mill should leave the mill and return to reactor 10 having an average particle size of about 50 microns. Where fluid energy mill is operated on an intermittent basis, the amount of silicon-copper mixture withdrawn from the fluidized bed 10 is adjusted upwardly from that withdrawn on a continuous basis and the degree of grinding or the percent reduction in average particle size remains substantially the same as the percent reduction in average particle size employed in the continuous operation.

Fluid energy mills are well known in the art and comprise an annular chamber with a plurality of pheripheral nozzles through which the gas energizing the fluid energy mill is introduced. The nozzles are selected so that the energizing fluid coming out of the nozzles have velocities approaching sonic. This high velocity fluid violently circulates in the annular space the powdered silicon-copper mixture flowing into the fluid energy mill, causing collisions between particles and collisions of particles with the walls. These collisions cause comminution of the particles. These fluid energy mills are also provided with outlets through which the fluidizing gas and the comminuted particles can exit. In the case of the apparatus of FIG. 1, these particles exit through line 15 and return to fluidized bed reactor 10. The specific size and shape of a fluidized bed reactor which can be used in the process of the present invention can vary within wide limits and the choice of a particular fluidized bed reactor is within the knowledge of those skilled in the art. For more details of the specific structure and operation of fluid energy mills, attention is directed to Chemical Engineering, vol. 59, pages 164 and 165 (August 1952).

The following examples are illustrative of the practice of my invention and are not intended for purposes of limitation. All parts are by weight.

A fluidized bed reactor system of the type described in FIG. 1 was operated employing methyl chloride gas as a feed for the reaction between methyl chloride and silicon to produce a mixture of methylchlorosilanes including methyltrichlorosilane and dimethyldichlorosilane. The reactor had a diameter of one foot and was 15 feet high. In a series of runs the cylindrical fluidized bed reactor was charged with 400 pounds of a powdered mixture of silicon having an average particles size of about 90 microns with about 60 percent by weight of the particles having actual diameters of from 20 to 200 microns, 30 pounds by weight of the copper oxide coated copper catalyst described in the aforementioned Ferguson et al. patent, and one pound of finely divided zinc. Methyl chloride, which had been superheated to a temperature of 270° C., was passed into the base of the fluidized bed reactor at a rate sufficient to provide an average methyl chloride velocity through the reactor of 0.5 feet per second at a pressure of about 50 p.s.i.g. at the top of the reactor. This methyl chloride flow rate was sufficient to cause elutriation of about 2 pounds per hour of the powdered mixture in the reactor. In each case the reaction was initiated by heating the fluidized bed reactor to a temperature of about 340° C. After initiation of the reaction, the temperature was allowed to drop to the steady state temperature of about 280 to 290° C. During the reaction powdered make-up silicon, make-up copper catalyst and make-up zinc were continuously added to the fluidized bed reactor. The silicon powder make-up in Examples 1, 2, and 3 had an average particle size of about 150 microns with about 55 percent by weight of the particles having actual diameters from 20 to 200 microns, and was added at a rate sufficient to maintain a constant amount of silicon in the fluidized bed reactor. The silicon powder make-up in Example 4 had an average particle size of about 90 microns. Fresh copper catalyst and zinc were added at a rate sufficient to maintain 30 pounds of copper catalyst in the fluidized bed and one pound of zinc in the fluidized bed. This procedure resulted in a production of about 100 pounds per hour of mixed methylchlorosilanes. In Examples 1, 2, and 3, continuous comminution of a portion of the solids in the fluidized bed was conducted. This was accomplished by withdrawing at a uniform rate about 100 pounds per hour of the solids from the fluidized bed and passing these solids into a fluid energy mill having an annular chamber 2 inches in diameter. The fluid energy mill was activated by passing about 80 percent by weight of the methyl chloride feed through the fluid energy mill. This methyl chloride used in the fluid energy mill was then passed into the reactor. Example 4 differed from the first three examples in that no comminution was employed and the reaction was merely continued to the point described below. The mixture of methylchlorosilanes and unreacted methyl chloride and elutriated solids were passed out of the top of the fluidized bed reactor and the particles having an average diameter greater than about 5 to 20 microns were separated and returned to the fluidized bed reactor. The finer particles were then filtered from the unreacted methyl chloride and mixture of methylchlorosilanes, and the unreacted methyl chloride was then separated from the mixture of chlorosilanes and returned to a storage tank, from whence it was again fed into the reactor.

In order to compare the results of the process of Examples 1, 2, and 3, which are within the scope of the present invention, with Example 4 which is typical of the prior art, the ratio of methyltrichlorosilane to dimethyldichlorosilane was continuously determined in each run. Each run was continued until the ratio of methyltrichlorosilane to dimethyldichlorosilane (the $T/D$ ratio) reached a value of 0.35. In the table below is listed the total time for each run, the fact of whether grinding was employed, the total production of mixed methylchlorosilanes, the average $T/D$ ratio during the course of the reaction, and the silicon utilization, which is the percentage of the silicon fed to the reactor which was converted to methylchlorosilanes.

Table

| Example | Comminution | Run Time (Hours) | Methylchlorosilane Production (Pounds) | Avg. T/D Ratio | Silicon Utilization, percent |
|---|---|---|---|---|---|
| 1 | Yes | 225 | 23,500 | 0.212 | 88.9 |
| 2 | Yes | 234 | 23,700 | 0.192 | 87.3 |
| 3 | Yes | 269 | 27,000 | 0.196 | 85.2 |
| 4 | No | 65 | 6,500 | 0.228 | 80.9 |

As is seen from the table, Examples 1, 2 and 3, which employed comminution of the particles of the fluidized bed with a differential between the average particle size of the make-up silicon and the silicon in the bed unexpectedly ran for over 200 hours before the $T/D$ ratio reached 0.35. In contrast to this, Example 4, in which no comminution was employed, ran for only 65 hours before the $T/D$ ratio reached 0.35. The production of mixed methylchlorosilanes averaged about 25,000 lbs. in the examples in which comminution was employed and was only about 6,500 lbs. when no comminution was employed. Thus the data of the examples show the marked increase in the production of mixed methylchlorosilanes having a desirable $T/D$ ratio by the process of the present invention. Furthermore the average $T/D$ ratio was lower in the process of my invention than in the prior art process.

While the examples have illustrated many of the features of the present invention, it should be understood that my invention is directed broadly to the continuous process for the preparation of various organochlorosilanes by the passage of an organic chloride through a fluidized silicon bed in which process make-up silicon having an average particle size greater than the average particle size of the silicon comprising the fluidized bed is continuously fed to said fluidized bed and in which the solids in the fluidized bed are comminuted at least intermittently to maintain a substantially constant average particle size for the silicon comprising the fluidized bed. This results in the increased utilization of the silicon fed to the fluidized bed to produce a mixture of organochlorosilanes having a significantly lower $T/D$ ratio than the mixed organochlorosilanes obtained in the absence of the particle size differential and in the absence of the comminution.

What I claim as new and desire to secure by Letters Patent of the United States is:

1. In the continuous process for the preparation of organochlorosilanes by the passage of an organic chloride through a fluidized bed comprising fluidizable silicon particles in which process make-up silicon is fed to said fluidized bed, the improvement which comprises (1) feeding to said fluidized bed make-up silicon having an average particle size greater than the average particle size of the silicon particles in said fluidized bed and (2) comminuting at least intermittently in a non-oxidizing atmosphere at least a portion of the silicon from said fluidized bed, and (3) and thereafter further employing in said fluidized bed the resulting comminuted portion of the silicon from said fluidized bed, the degree of comminution of said silicon being adjusted to maintain a substantially constant average particle size for the silicon comprising said fluidized bed.

2. In the continuous process for the preparation of organochlorosilanes by the passage of an organic chloride vapor through a fluidized bed comprising fluidizable silicon particles in which process make-up silicon is continuously fed to said fluidized bed, the improvement which comprises (1) feeding to said fluidized bed make-up silicon having an average particle size greater than the average particle size of the silicon particles in said fluidized bed and (2) continuously comminuting in a non-oxidizing atmosphere a portion of the silicon from said fluidized bed, and (3) and thereafter further employing in said fluidized bed the resulting comminuted portion of the silicon from said fluidized bed, the degree of comminution of said silicon being adjusted to maintain a substantially constant average particle size for the silicon comprising said fluidized bed.

3. In the continuous process for the preparation of organochlorosilanes by the passage of an organic chloride through a fluidized bed comprising fluidizable silicon particles in which process make-up silicon is continuously fed to said fluidized bed, the improvement which comprises (1) continuously feeding to said fluidized bed silicon having an average particle size greater than the average particle size of the silicon particles in said fluidized bed and (2) continuously comminuting in an organochlorosilane atmosphere a portion of the silicon from said fluidized bed, and (3) and thereafter further employing in said fluidized bed the resulting comminuted portion of the silicon from said fluidized bed, the degree of comminution of said silicon being adjusted to maintain a substantially constant average particle size for the silicon comprising said fluidized bed.

4. In the continuous process for the preparation of mixed methylchlorosilanes by the passage of methyl chloride through a fluidized bed comprising fluidizable silicon particles in which process make-up silicon is continuously fed to said fluidized bed, the improvement which comprises (1) continuously feeding to said fluidized bed make-up silicon having an average particle size greater than the average particle size of the silicon particles in said fluidized bed and (2) continuously comminuting in a methyl chloride atmosphere a portion of the silicon from said fluidized bed, and (3) and thereafter further employing in said fluidized bed the resulting comminuted portion of the silicon from said fluidized bed, the degree of comminution of said silicon being adjusted to maintain a substantially constant average particle size for the silicon comprising said fluidized bed.

5. In the continuous process for the preparation of mixed methylchlorosilanes by the passage of methyl chloride through a fluidized bed comprising fluidizable silicon particles in which process make-up silicon is continuously fed to said fluidized bed, the improvement which comprises (1) continuously feeding to said fluidized bed silicon having an average particle size greater than the average particle size of the silicon particles in said fluidized bed, (2) continuously withdrawing a portion of the silicon from said fluidized bed, (3) continuously comminuting in a methyl chloride atmosphere the silicon withdrawn from said fluidized bed and (4) returning said comminuted silicon to said fluidized bed, the degree of comminution of said silicon being adjusted to maintain a substantially constant average particle size for the silicon comprising said fluidized bed.

6. An apparatus suitable for continuously making organochlorosilanes as a result of maintaining a fluid bed of powdered silicon having a substantially constant average particle size, resulting from the removal therefrom, at least intermittently, of at least a portion of said powdered silicon, the comminution of said powdered silicon in an oxygen-free atmosphere, and the return of said comminuted silicon to said fluid bed, which comprises, in combination, a vertically disposed vessel having heat transfer means, an energized gas annular grinding means external to said vessel, an energized gas forming means, means for introducing make-up silicon into said vessel, means for introducing gaseous reactant into said vessel, means for withdrawing silicon from said vessel to said grinding means, means for delivering energized gas from said energized gas forming means to said grinding means, a separate energized gas conduit means from said grinding means to said vessel for returning a mixture of said energized gas and comminuted silicon to the bottom of said fluid bed means for delivering energized gas from said energized gas forming means to the bottom of said vessel.

References Cited in the file of this patent

UNITED STATES PATENTS

| | | |
|---|---|---|
| 2,380,995 | Rochow | Aug. 7, 1945 |
| 2,389,931 | Reed et al. | Nov. 27, 1945 |
| 2,466,412 | Gilliam et al. | Apr. 5, 1949 |
| 2,466,413 | Gilliam et al. | Apr. 5, 1949 |
| 2,721,168 | Kimberlin et al. | Oct. 18, 1955 |
| 2,776,799 | Spitz et al. | Jan. 8, 1957 |
| 2,789,942 | Cooper et al. | Apr. 23, 1957 |
| 2,874,095 | Boisture et al. | Feb. 17, 1959 |
| 2,889,269 | Nicholson | June 2, 1959 |